United States Patent Office 3,605,939
Patented Sept. 20, 1971

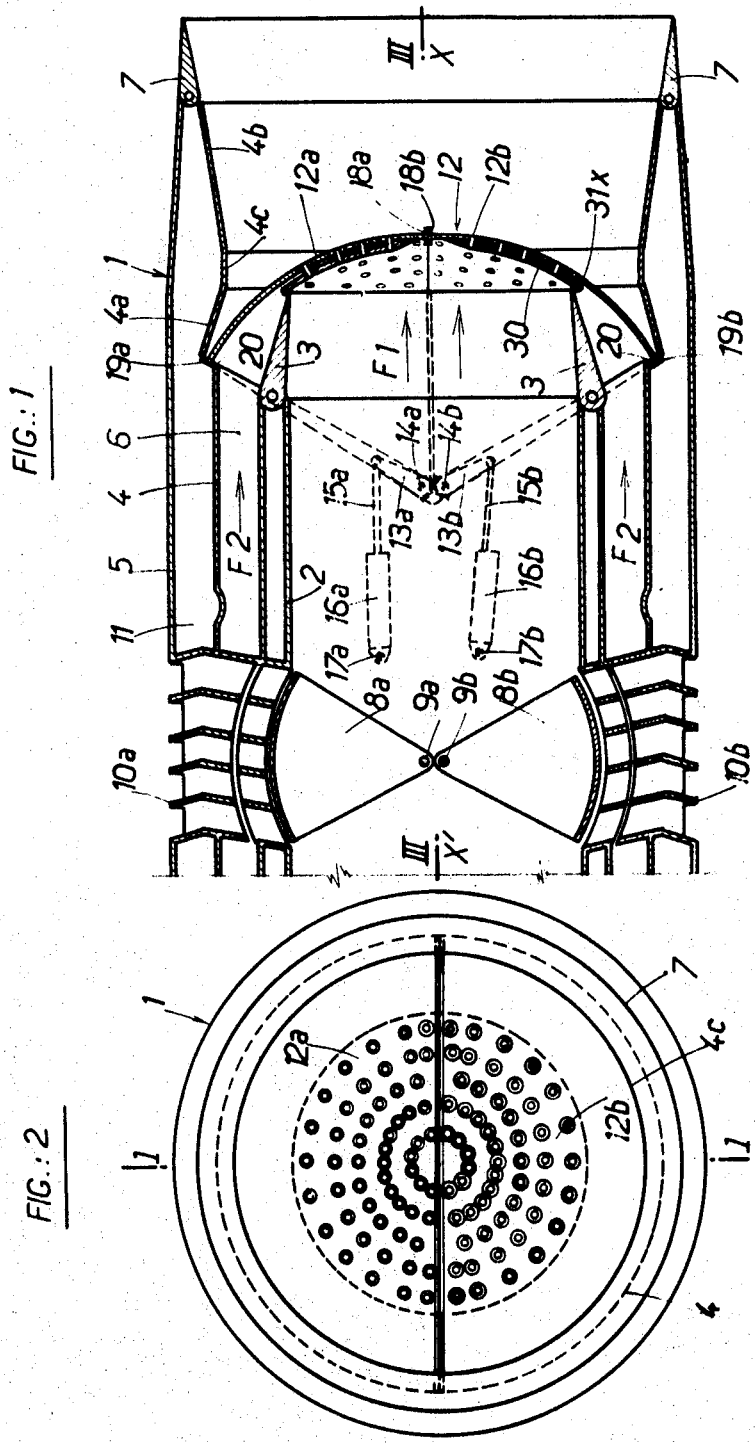

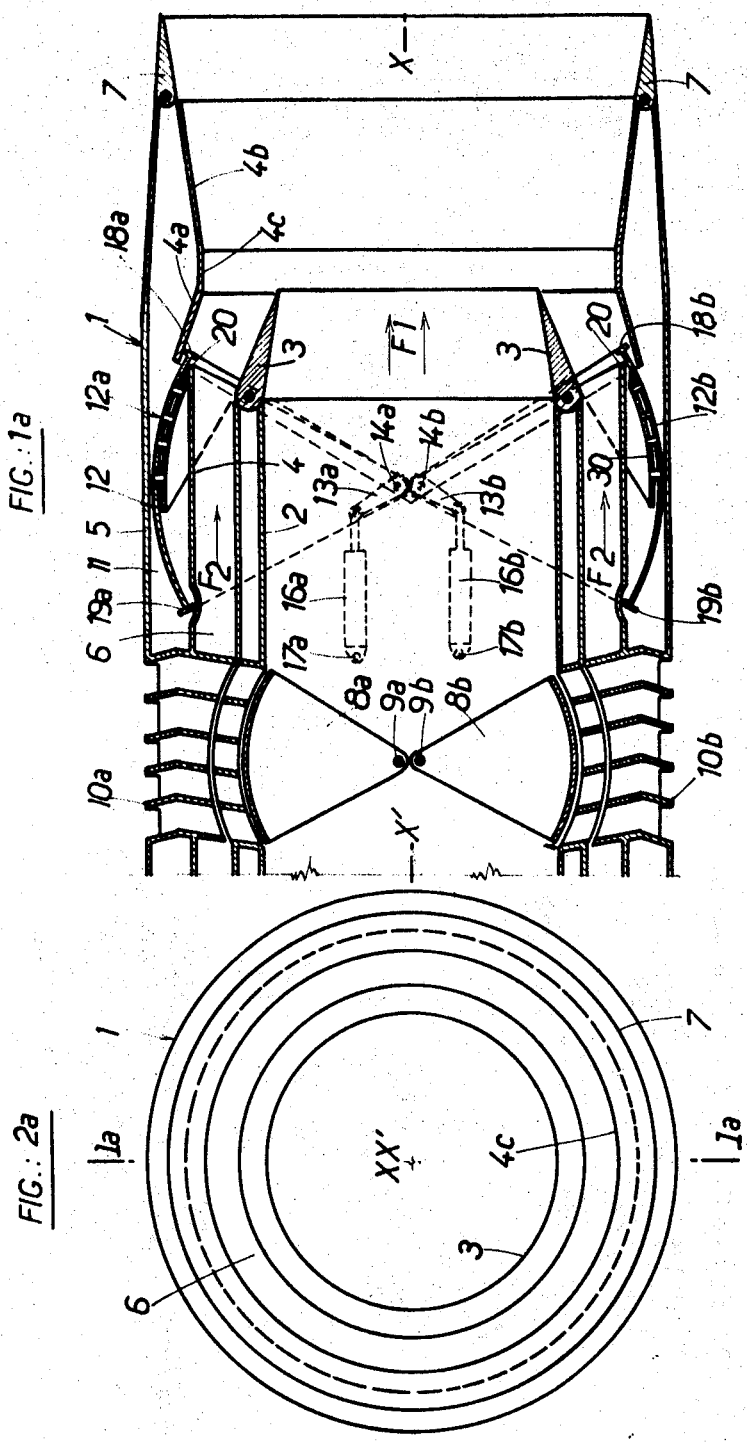

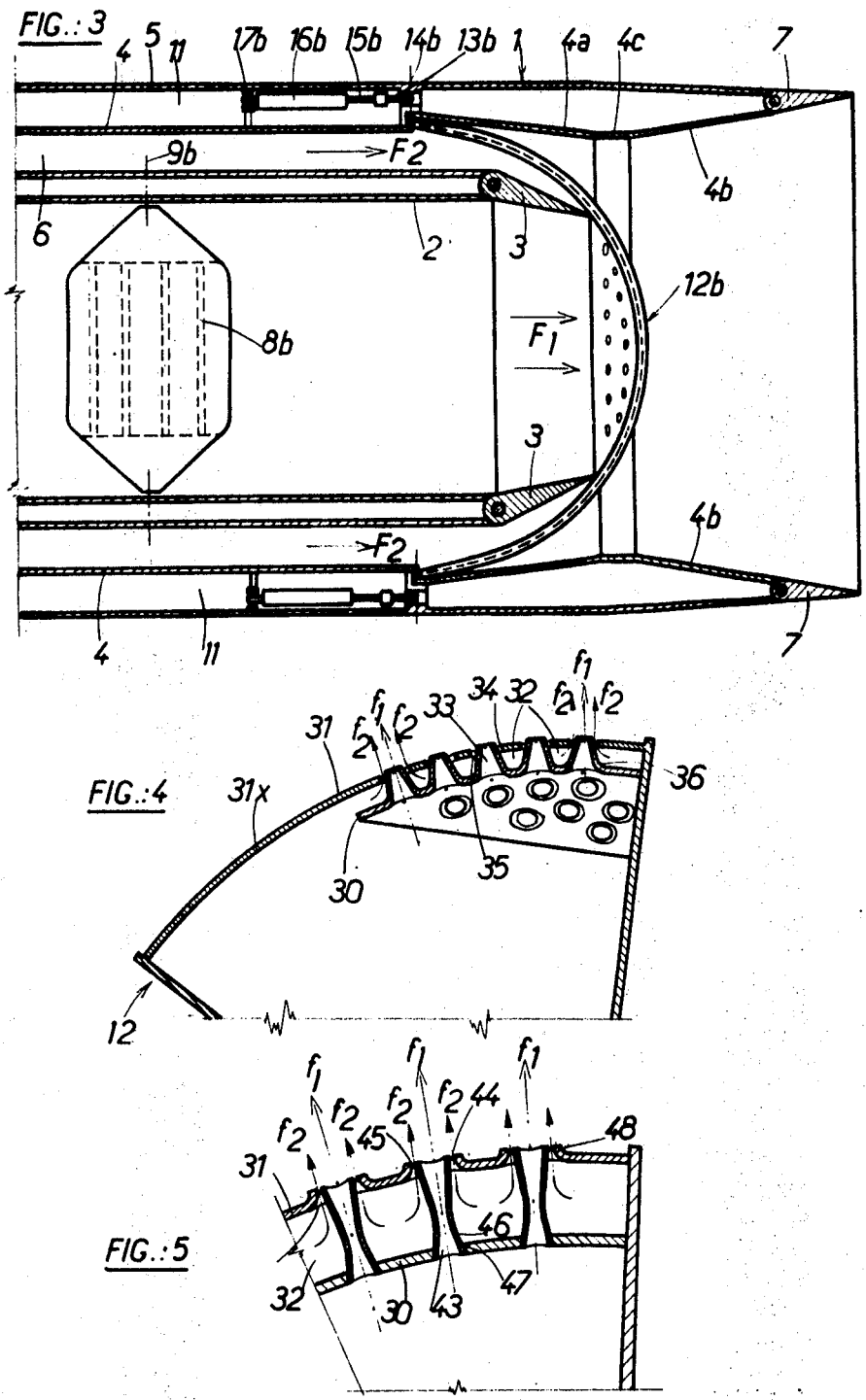

3,605,939
DEVICE FOR REDUCING THE NOISE PRODUCED BY FLUID FLOW ESCAPING FROM A NOZZLE
Louis Duthion, Paris, France, assignor to
Bertin & Cie, Boite Postale, France
Filed Dec. 30, 1969, Ser. No. 889,165
Claims priority, application France, Dec. 30, 1968,
182,228
Int. Cl. B64d 33/06
U.S. Cl. 181—33HC
18 Claims

ABSTRACT OF THE DISCLOSURE

A noise reducing device for an ejector type nozzle having a primary fluid flow surrounded by a secondary fluid flow, which device comprises a hollow obstacle which can be arranged to intercept the primary flow and includes a number of passages for splitting the intercepted portion of the primary flow into a number of elementary flows, together with means for placing the interior of the obstacle into communication with the secondary flow thereby to form a number of elementary secondary flows which envelop at least some of said elementary primary flows.

BACKGROUND OF THE INVENTION

This invention relates to a device for reducing the noise produced by a fluid flow or jet escaping from a nozzle during operation. The invention relates more particularly, although not exclusively, to nozzles forming part of jet-propulsion systems and, of nozzles of this kind, applies in particular to those operating at a high expansion ratio, as is the case in power plants designed for use in supersonic aircraft.

PRIOR ART

As those skilled in the art will appreciate, the means generally employed to reduce the noise which accompanies the discharge of a fluid acts to increase the extent of the region of mixing between the fluid and the surrounding environment, for example the air, into which said fluid penetrates at exit from the nozzle. Thus, it is known to create, at the periphery of the existing jet, undulations which increase the circumferential extent of the jet, or again to divide the jet into elementary jets of small cross-sectional area, this possibly in combination with the introduction of auxiliary dilution fluid, for example air, into the interior of the jet.

OBJECT OF THE INVENTION

It is the proposal of the invention to introduce improvements with respect to the general means which have been described thus far and a first object of the invention is therefore to make it possible to produce noise-reducing devices which, compared with the known devices, have a substantially improved efficiency.

Another object of the invention is to produce a noise-reducing device the construction of which is not only simple and compact but which, if required, can easily be made retractable.

Another object of the invention is to make it possible to adapt this kind of device to an ejector-type nozzle of the kind which form part of modern jet-propulsion power plants used in supersonic aircraft, a nozzle of this kind, as those skilled in the art will be aware, comprising a primary nozzle from which, in operation, a primary fluid flow escapes, and a secondary fairing disposed around said primary nozzle in order to determine in relation thereto a peripheral space through which a secondary fluid flow passes enveloping the central flow exiting from the primary nozzle.

BRIEF SUMMARY OF THE INVENTION

In accordance with the invention, a device for reducing the noice produced, in operation, by a jet of fluid escaping from an ejector-type nozzle, comprises, in combination:

at least one obstacle arranged in the path of the primray flow substantially transversely of the general direction of said flow and intercepting at least a portion thereof, said obstacle comprising a hollow structure delimited by an upstream wall and by a downstream wall which are separated from one another in the direction of flow of the jet by an interval, an internal space thus being defined between them;

a plurality of elementary passages each arranged to pass from one side of the obstacle to the other, said passages being supplied, upstream of the obstacle, with the intercepted portion of the primary flow and splitting said portion into a corresponding number of elementary flows escaping downstream of the obstacle;

a plurality of orifices formed across the downstream wall of the obstacle respectively around certain ones at least of the elementary passages in order to define in relation to said passages a corresponding number of substantially annular passages communicating with the interior of the obstacle; and means for placing said internal space in communication with the peripheral space through which the secondary flow passes in order to form, around the elementary primary fluid flows, substantially annular secondary fluid flows which envelop the former.

The solid jet leaving the nozzle is thus split into a plurality of elementary jets each of which is surrounded by a jet of auxiliary fluid which has a substantial dilution effect upon it so that the combined action of the presence, at all points, of the auxiliary fluid jets, and of the substantial increase in the extent of the zone of mixing between the two fluids, ultimately leads to the attainment of a particularly effective silencing effect. This silencing effect is, furthermore, a permanent one, because the reconstitution of a solid jet from the plurality of elementary jets downstream of the obstacle is delayed by the presence of the dilution jets.

FURTHER FEATURES OF THE INVENTION

Certain ones, at least, of the elementary passages can be adapted to do duty as nozzles, and certain ones of these, again, may be of convergent-divergent design. The assembly of elementary nozzles can thus play the part of a single high-efficiency nozzle which makes it possible to retain substantial thrust despite the interposition of the silencer device. It will be observed, in this context, that the bulk entraining of secondary fluid through the plurality of elementary ejectors or venturis thus formed is translated overall into a substantial gain in thrust.

Preferably, the obstacle will be associated with means for displacing it between an operative position in which it intercepts at least part of the primary flow and an inoperative position in which it is withdrawn from the said flow.

The obstacle will advantageously extend into the primary fluid flow up to the periphery of the primary nozzle, this preferably in the neighbourhood of the exit section of said nozzle. If said exit section is determined by variable terminal flaps, these flaps will then be substantially in contact at their trailing edges with the obstacle, and this enables a certain degree of sealing to be obtained at this location, between the primary and secondary flows. This arrangement, furthermore, has the advantage that the supply to the space inside the obstacle is facilitated.

To this end, the downstream wall of the obstacle can be extended externally beyond the periphery of the exit section of the primary nozzle in order to project into the peripheral space through which the secondary flow passes and in order to intercept at least a portion of said flow and introduce it into the internal space delimited between the two walls of the obstacle.

Preferably, the exit section of the primary fluid flow will remain substantially the same whether the noise-reducing device is in its operative or inoperative position. To this end, the sum of the sections of the elementary passages may be substantially equal to the exit section of the primary nozzle and delimited by the terminal flaps when the noise-reducing device is in the inoperative condition, and advantageously, the terminal flaps will be opened when the noise-reducing device is placed in the operative position, the exit section of the primary fluid flow then being determined by said sum of said sections of said elementary passages.

The ensuing description which relates to the accompanying drawing will indicate by way of a non-limitative example how the invention may be carried into practice.

BRIEF SUMMARY OF DRAWINGS

In the drawings:

FIG. 1 is a view in longitudinal section through an ejector type nozzle equipped with a retractable device for reducing the noise produced by a jet of fluid escaping from a nozzle, said device being illustrated in the operative position.

FIG. 2 is an end elevation, from the downstream direction, of the device illustrated in FIG. 1;

FIGS. 1a and 2a are views respectively similar to FIGS. 1 and 2 but corresponding to the case in which the noise-reducing device is in the retracted position;

FIG. 3 is a sectional view, on the line III—III of FIG. 1 through the nozzle equipped with this noise-reducing device;

FIG. 4 is a view on a larger scale through a noise-reducing element; and

FIG. 5 is a view on a larger scale through a variant embodiment of a detail of a noise-reducing element.

DESCRIPTION OF EMBODIMENTS

In FIGS. 1 to 3, the general reference 1 has been used to indicate a nozzle which is assumed to be a solid of revolution around an axis X'–X and forms, in the example illustrated, the rear part of a jet engine the forward part of which has not been shown.

This nozzle is of the ejector type and comprises a primary nozzle 2 terminating downstream in adjustable flaps 3. In operation a primary fluid flow $F_1$ escapes from the nozzle, which also comprises a secondary fairing surrounding said primary nozzle and constituted by an internal wall 4 and an external wall 5. The wall 4 of the secondary fairing surrounds the primary nozzle in order to determine a peripheral space 6 in relation thereto, through which, in operation, a secondary fluid flow $F_2$ passes. Advantageously, at its downstream end, this wall will have a profile which is successively convergent 4a and divergent 4b, in order to define a throat 4c located substantially downstream of the exit section from the primary nozzle and will preferably be terminated by similar adjustable flaps 7. As those skilled in the art will appreciate, this kind of arrangement is particularly suitable for power plants of high expansion ratios of the kind used, for example, in supersonic aircraft.

The nozzle can, furthermore, be equipped with a reverse-thrust arrangement. This known kind of device can be constituted by obstacles 8a, 8b, which can pivot about joints 9a, 9b. In the reverse thrust configuration, the primary fluid flow deflected by the obstacles 8a, 8b is guided by the blades 10a, 10b and escapes in a direction such that the thrust has a component which decelerates the vehicle. In normal operation, the said blades are obturated by the elements 8a, 8b. Between the internal walls 4 and external walls 5 of the secondary fairing there is a peripheral space 11.

The primary fluid is generally constituted by propulsive gas at high speed, pressure and temperature, whilst the secondary fluid flow can be constituted by air taken, for example, from the intake of the engine or from a point between two stages of an engine compressor, or again directly from the exterior.

This nozzle is equipped with a noise-reducing device in accordance with the invention. This device comprises, in the example illustrated in FIGS. 1 to 3, an obstacle 12 which can be arranged in the path of the primary jet substantially transversely to the general direction of flow thereof, in order to intercept at least a portion of said jet but preferably the totality thereof. This obstacle here has the form of a spherical sector whose axis of symmetry is defined by the axis X'–X, and is constituted by two complementary elements 12a, 12b, substantially symmetrically disposed in relation to an axial plane perpendicular to the plane of FIG. 1. The elements 12a, 12b are respectively integral with two sectors 13a, 13b which can swing around transverse pivots 14a, 14b and are controlled by the rods 15a, 15b of jacks 16a, 16b. The latter are located in the peripheral space 11 and respectively articulated at 17a, 17b to a fixed structure integral with said peripheral duct. The complementary elements 12a, 12b can thus be displaced between two terminal positions, namely an operative position as shown in FIG. 1, in which they are contiguous and intercept the primary jet, and an inoperative position, shown in FIG. 1a, in which they are spaced apart and retracted away from said jet into the interior of the peripheral space 11. The toothed sectors 13a, 13b are in engagement with one another in order to ensure synchronism of displacement of the two elements 12a, 12b.

Each of the complementary elements 12a, 12b is equipped with extensions 18a, 19a, and 18b, 19b cooperating with lips 20 acting as stops on the peripheral casing 11 in order to prevent or limit the introduction of fluid into said casing in one or other of the terminal positions of said elements.

The obstacle 12 (in the present instance each of the complementary elements 12a, 12b), has a hollow structure of special design, illustrated on a larger scale in FIGS. 4 and 5.

This hollow structure is delimited by two substantially parallel walls, namely an upstream wall 30 and a downstream wall 31, separated from one another by a gap in order to define between them an internal space 32. Elementary passages 33 (FIG. 4) or 43 (FIG. 5) are provided in large numbers and in each case extend through the obstacle 12 from one side to the other. These passages, which can be distributed uniformly on circles coaxial to the axis X'–X (see FIG. 2) are thus supplied upstream of the obstacle with the portion of the fluid jet which is intercepted by the obstacle, and they divide said portion into a corresponding number of elementary jets, schematically indicated by the arrows $f_1$, which escape downjets have been schematically illustrated in FIGS. 4 and 5 by the arrows $f_2$.

The orifices 34 (FIG. 4) or 44 (FIG. 5), formed across the downstream wall 31 respectively around certain ones at least of the elementary passages 33 (FIG. 3) or 43 (FIG. 4), define in relation to said passages the corresponding number of substantially annular passages 35 (FIG. 4) or 45 (FIG. 5) communicating with the internal space 32. The latter itself communicates with a source of auxiliary fluid, in the present instance the secondary fluid flow passing through the peripheral space 6, so that in operation there are formed around the jets $f_1$ escaping from the elementary passages, substantially annular jets of auxiliary fluid which envelop the former jets. These jets have been schematically illustrated in FIGS. 4 and 5 by the arrows $f_2$.

The elementary passages can be designed on the line of nozzles, for example of convergent design (FIG. 4) or convergent-divergent design (FIG. 5). As FIG. 4 shows, the elementary passages or nozzles 33 can be formed in the relief portions 36 of the upstream wall 30 of the obstacle, said portions extending in the direction of and passing through the downstream wall 31 of, the obstacle. This kind of design can be obtained, for example, by a drawing operation.

As FIG. 5 shows, these passages or nozzles can equally be constituted by independent elements 46 fitted in bores 47 formed in the upstream wall 30 of the obstacle, said elements extending, as before, in the direction of and passing through the downstream wall 31 of, the obstacle. The same figure also shows that the orifices 44 formed in the downstream wall 31 can be designed as the exits of jets or nozzles 48 through which the auxiliary fluid passes and which are obtained, for example, by drawing the wall 31. In this way, the conditions of flow of the auxiliary fluid are improved, as also the local venturi effect between the two flows.

FIG. 1 illustrates how the secondary fluid is supplied to the internal space of the obstacle. The obstacle 12 extends into the jet of primary fluid up to the periphery of the primary nozzle, and comes substantially into contact with the trailing edges of the terminal primary flaps 30 so that sealing between the primary and secondary flows prior to their mutual dilution, downstream of the obstacle, is obtained. The downstream wall 31 of the obstacle is extended externally beyond the periphery of the exit section of the primary nozzle, in order to project into the peripheral space 6 and to intercept at least a fraction of the secondary fluid flow passing through said space and directed into the internal space 34 depend between the walls 30 and 31 of the obstacle. In this configuration, the extensions 19a, 19b cooperate with the lips 20 in order to limit the penetration of fluid into the peripheral space 11.

In operation, the primary fluid intercepted by the obstacle is split by the elementary passages or nozzles such as 33 (FIG. 4) or 43 (FIG. 5), into a plurality of elementary jets of very small individual transverse cross-section, the sum of these sections, however, being predetermined so that it is substantially equivalent to the primary nozzle exit section, as determined by the flaps 3 when the noise-reducing device is in the inoperative position (FIG. 1a). When said device is placed in the operative position, the flaps 3 (FIG. 1) will preferably be opened and the primary fluid exit section will then be determined by the sum of the sections of the elementary nozzles. Thus, it can be arranged, making provision for appropriate adjustment of the opening of the flaps 3, for an overall convergent effect to be obtained in the system defined by the primary nozzle 2, the flaps 3 and the obstacle 12. The elementary jets thus obtained are surrounded, in each case, by an annular elementary jet of secondary fluid. Taking into account the increase in the extent of the mixing zone in accordance with the division of the jets, and also the fact that the auxiliary fluid can be placed in individual contact with each of the elementary jets, the silencing effect thus obtained is particularly good. As already stated, this effect is, moreover, a permanent one because of the presence, between the elementary jets of primary fluid, of the annular jets of dilution fluid which inhibit or at least substantially retard the uniting of the primary jets downstream of the obstacle.

It will be observed too, that each elementary primary jet entrains with it, by venturi effect, an appreciable quantity of secondary fluid; the total quantity of secondary fluid thus entrained is substantial and this is translated into terms of a net gain in thrust which compensates for any losses due to the presence of the obstacle.

An examination of FIGS. 1 and 1a shows, on the other hand, that the spherical sector form given to the obstacle 12 makes it possible to keep the size of the noise-reducing device down to a minimum. In the operative position (FIG. 1), these elements occupy only a very short axial length. In the retracted position (FIG. 1a), they are located in a very restricted peripheral space 11 and consequently do not give rise to any increase in the overall diameter of the nozzle system. In this latter position, sealing of the peripheral space 11 is ensured by cooperation between the elements 18a, 18b of the obstacle with the lips 20 of the casing.

It will be appreciated that the embodiments described are merely examples and are open to modification, in particular by the substitution of equivalent techniques, without departing from the scope of the invention.

Thus, the invention extends equally to noise-reducing devices or silencers in on-board applications, and to silencers for track use, and is in no way limited by the nature of the fluids used nor by the field of application (jet engines) which has been picked out for the above description.

I claim:

1. In and for an ejector type nozzle comprising a primary nozzle adapted to discharge a primary fluid flow, and a secondary fairing arranged around said primary nozzle, whereby a peripheral space is formed between said primary nozzle and said secondary fairing, said peripheral space being adapted to pass a secondary fluid flow, a noise-reducing device comprising, in combination:

at least one obstacle arranged in the path of the primary flow substantially transversely of the general direction of said flow and intercepting at least a portion thereof, said obtacle comprising a hollow structure delimited by an upstream wall and by a downstream wall which are separated from one another in the direction of flow of the jet, by an interval, an internal space thus being defined between them;

a plurality of elementary passages each arranged to pass from one side of the obstacle to the other, said passages being supplied upstream of the obstacle, with the intercepted portion of the primary flow and splitting said portion into a corresponding number of elementary flows escaping downstream of the obstacle;

a plurality of orifices formed across the downstream wall of the obstacle respectively around certain ones at least of the elementary passages in order to define in relation to same, a corresponding number of substantially annular passages communicating with the interior of the obstacle; and means for placing said internal space in communication with the peripheral space through which the secondary flow passes, in order to form around the elementary primary fluid flows, substantially annular secondary fluid flows which envelop the former.

2. A device as claimed in claim 1, wherein certain at least of said elementary passages comprise elementary nozzles.

3. A device as claimed in claim 2, wherein certain at least of said elementary nozzles have a convergent-divergent configuration.

4. A device as claimed in claim 1, wherein one of the two walls of said obstacle comprise relief portions extending in the direction of and passing through the other wall of, said obstacle, said elementary passages comprising said relief portions.

5. A device as claimed in claim 1, wherein said elementary passages comprise independent elements passing through the two walls of said obstacle and fixed to one at least of said walls.

6. A device as claimed in claim 1, wherein the ejector nozzle has an axis substantially parallel to the general direction of flow of the primary and secondary fluids; and wherein said elementary passages are distributed uniformly about said axis.

7. A device as claimed in claim 1, wherein said substantially annular passages surrounding said elementary passages, have a nozzle configuration.

8. A device as claimed in claim 1, wherein the ejector nozzle has the form of a solid of revolution around an axis substantially parallel to the general direction of flow of primary and secondary fluids; and wherein said obstacle substantially takes the form of a spherical surface whose axis of revolution is coincidental with said aforementioned axis.

9. A device as claimed in claim 1, wherein said obstacle extends into the primary fluid flow up to the periphery of the primary nozzle.

10. A device as claimed in claim 9, wherein the downstream extremity of the primary nozzle bears against said obstacle.

11. A device as claimed in claim 10, wherein said downstream extremity of said primary nozzle comprises variable-position flaps.

12. A device as claimed in claim 10, wherein the downstream wall of said obstacle comprises portions projecting externally beyond the periphery of the exit section of the primary nozzle into said peripheral space through which the secondary fluid flow passes, whereby at least a fraction of said secondary fluid flow is intercepted and introduced into said internal space delimited between the walls of said obstacle.

13. A device as claimed in claim 1, further comprising control means for displacing said obstacle between an operative position in which it projects into said primary flow, and an inoperative position in which it is withdrawn from said flow.

14. A device as claimed in claim 13, wherein the nozzle has an axis substantially parallel to the general direction of flow of primary and secondary fluids; wherein said obstacle comprises two complementary elements which are substantially symmetrical in relation to a plane passing through said axis; and wherein said control means comprises arrangements for displacing said complementary elements between an operative position in which they are contiguous and intercept a fraction at least of the primary fluid flow, and an inoperative position in which they are spaced apart and retracted from said flow.

15. A device as claimed in claim 11, further comprising control means for displacing said obstacle between an operative position in which it projects into said primary flow, and an inoperative position in which it is withdrawn from said flow, the sum of the cross-sectional areas of the elementary passages being substantially equivalent to the exit cross-sectional area of the primary nozzle as defined by the variable-position flaps, when said obstacle is in the inoperative position.

16. A device as claimed in claim 11, further comprising control means for displacing said obstacle between an operative position in which it projects into said primary flow, and an inoperative position in which it is withdrawn from said flow, the exit cross-sectional area of the primary nozzle as defined by said variable-position flaps being larger than the sum of the cross-sectional areas of the elementary passages when said obstacle is in its operative position.

17. A device as claimed in claim 14, further comprising a casing arrangement located at the periphery of the secondary fairing, wherein the two complementary elements of said obstacle are retracted, in the inoperative position, inside said casing arrangement.

18. A device as claimed in claim 17, further comprising extensions integral with said complementary elements, and stop arrangements integral with said casing, said extensions cooperating in substantially sealing fashion with said stops, whereby the introduction of fluid into said casing arrangement is limited.

References Cited

UNITED STATES PATENTS

| | | | |
|---|---|---|---|
| 3,050,937 | 8/1962 | James et al. | 181—33(.222) |
| 3,053,340 | 9/1962 | Kutney | 181—33(.221) |
| 3,139,153 | 6/1964 | De Remer | 181—46X |
| 3,262,264 | 7/1966 | Gardiner et al. | 239—127.3 |
| 3,512,716 | 5/1970 | Kopp | 239—265.29 |

FOREIGN PATENTS

| | | | |
|---|---|---|---|
| 836,175 | 6/1960 | Great Britain | 181—33(.221) |

ROBERT S. WARD, JR., Primary Examiner

U.S. Cl. X.R.

181—33HD; 239—127.3, 265.13, 265.17, 265.29